United States Patent
Ma

(10) Patent No.: US 9,264,113 B2
(45) Date of Patent: Feb. 16, 2016

(54) FRAME SYNCHRONIZATION METHOD AND APPARATUS OF WIRELESS SYSTEM, AND WIRELESS SYSTEM

(71) Applicant: HUAWEI TECHNOLOGIES CO., LTD., Shenzhen, Guangdong (CN)

(72) Inventor: Jun Ma, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/626,482

(22) Filed: Feb. 19, 2015

(65) Prior Publication Data

US 2015/0229368 A1      Aug. 13, 2015

Related U.S. Application Data

(63) Continuation of application No. PCT/CN2012/080562, filed on Aug. 24, 2012.

(51) Int. Cl.
*H04B 7/08* (2006.01)
*H04B 7/04* (2006.01)
(Continued)

(52) U.S. Cl.
CPC ............ *H04B 7/0413* (2013.01); *H04B 7/04* (2013.01); *H04B 7/0811* (2013.01); *H04L 27/2656* (2013.01); *H04L 27/2675* (2013.01); *H04L 7/04* (2013.01)

(58) Field of Classification Search
CPC ............ H04B 7/18589; H04B 7/2048; H04B 7/2125; H04B 7/2662; H04B 7/2665; H04B 7/2668; H04B 7/2671; H04B 7/2678; H04B 7/2681; H04B 7/2684; H04B 7/2687
USPC ......... 375/316, 259, 260, 285, 346, 347, 267, 375/354, 362, 364, 365, 366, 367, 368
See application file for complete search history.

(56) References Cited

U.S. PATENT DOCUMENTS 6,785,350 B1 *  8/2004  Poulbere et al. .............. 375/343
7,058,151 B1    6/2006  Kim
(Continued)

FOREIGN PATENT DOCUMENTS

CN      1355971     6/2002
CN      1794850     6/2006
(Continued)

OTHER PUBLICATIONS

PCT International Search Report mailed on May 30, 2013 in corresponding International Patent Application No. PCT/CN2012/080562.
(Continued)

*Primary Examiner* — Siu Lee
(74) *Attorney, Agent, or Firm* — Staas & Halsey LLP

(57) ABSTRACT

Embodiments of the present invention provide a frame synchronization method. The frame synchronization method of the wireless system includes: separately delaying a signal received from one of N receiving antennas in K tributaries, and outputting K delayed signals, where N and K are positive integers; generating a first output signal by performing a correlation operation on the K delayed signals and a preamble subsequence; generating a second output signal by performing the correlation operation on each of the K delayed signals and each of the K delayed signals itself; and performing cancellation processing for the first output signal and the second output signal to obtain a string of data stream, obtaining a maximum value of the string of data stream as a correlation peak, so as to determine a position of a frame header according to a time point corresponding to the correlation peak.

20 Claims, 9 Drawing Sheets

(51) Int. Cl.
*H04L 27/26* (2006.01)
*H04L 7/04* (2006.01)

(56) References Cited

U.S. PATENT DOCUMENTS

| | | | |
|---|---|---|---|
| 7,194,055 B2* | 3/2007 | Tandai et al. | 375/368 |
| 2006/0115025 A1* | 6/2006 | Kim et al. | 375/343 |
| 2006/0133321 A1 | 6/2006 | Lim et al. | |
| 2007/0058521 A1 | 3/2007 | Guo et al. | |
| 2007/0230592 A1 | 10/2007 | Choi et al. | |
| 2009/0168937 A1 | 7/2009 | Lee et al. | |
| 2009/0225882 A1* | 9/2009 | Yoshida | 375/260 |
| 2010/0091742 A1* | 4/2010 | Lee et al. | 370/336 |
| 2011/0103534 A1 | 5/2011 | Axmon et al. | |

FOREIGN PATENT DOCUMENTS

| | | |
|---|---|---|
| CN | 1933470 | 3/2007 |
| CN | 101405985 | 4/2009 |
| CN | 101442360 | 5/2009 |
| CN | 101951356 | 1/2011 |
| EP | 1 524 813 A2 | 4/2005 |
| WO | 2004/036861 A2 | 4/2004 |
| WO | 2008/107730 A1 | 9/2008 |
| WO | WO 2011/120212 A1 | 10/2011 |

OTHER PUBLICATIONS

International Search Report mailed May 30, 2013 for corresponding PCT Application No. PCT/CN2012/080562.

Office Action mailed Sep. 1, 2014 for corresponding Chinese Patent Application No. 201280001091.X.

Y. Zhi-qiang et al., "Timing synchronization algorithm for MIMO-OFDM systems with distributed antennas," *Chinese Journal of Radio Science*, vol. 25, No. 4, Aug. 2010, pp. 724, 717-523.

Extended European Search Report dated Nov. 3, 2015 in corresponding European Patent Application No. 12883114.6.

\* cited by examiner

US 9,264,113 B2

FRAME SYNCHRONIZATION METHOD AND APPARATUS OF WIRELESS SYSTEM, AND WIRELESS SYSTEM

CROSS-REFERENCE TO RELATED APPLICATIONS

This application is a continuation of International Application No. PCT/CN2012/080562, filed on Aug. 24, 2012, which is hereby incorporated by reference in its entirety.

TECHNICAL FIELD

The present invention relates to the communications field, and in particular, to a frame synchronization method and an apparatus of a wireless system, and a wireless system.

BACKGROUND

A multiple input multiple output, multiple input multiple output (MIMO) system is a frequency multiplexing system with a high spectrum utilization rate. Compared with a single input single output, single input single output (SISO) system, a spectrum utilization rate of an M*N MIMO system is Min (M,N) times of that of the SISO system, where M and N are integers greater than zero, M refers to the number of transmitting antennas, and N refers to the number of receiving antennas.

According to a radio frequency structure and spacing between antennas of the system, the MIMO system may be categorized into a centralized MIMO system and a distributed MIMO system. Generally, spacing between antennas of the centralized MIMO system is relatively small, for example, one base station connects to a plurality of antennas, and the plurality of antennas is usually arranged in one place. Spacing between antennas of the distributed MIMO system is relatively large, for example, one antenna connects to one base station, and spacing between antennas is relatively large because a distance between base stations is relatively large. Compared with the centralized MIMO system, the distributed MIMO system can obtain a higher diversity gain, which is an important development trend of a wireless communications MIMO system in the future.

However, using an existing frame synchronization method may cause a frame synchronization error in the distributed MIMO system. Therefore, a frame synchronization method that can adapt to the distributed MIMO system is required.

SUMMARY

Embodiments of the present invention provide a frame synchronization method and an apparatus of a wireless system, and a wireless system, which can improve accuracy of frame synchronization of the wireless system.

According to a first aspect, a frame synchronization method of a wireless system is provided, including: separately delaying a signal received from one of N receiving antennas in K tributaries, and outputting K delayed signals, where N and K are positive integers; generating a first output signal by performing a correlation operation on the K delayed signals and a preamble subsequence; generating a second output signal by performing the correlation operation on each of the K delayed signals and each of the K delayed signals itself; and performing cancellation processing for the first output signal and the second output signal to obtain a string of data stream, and obtaining a maximum value of the string of data stream as a correlation peak, so as to determine a position of a frame header according to a time point corresponding to the correlation peak.

In a first possible implementation manner, the separately delaying a signal received from one of N receiving antennas in K tributaries, and outputting K delayed signals includes: separately delaying the signal received from one of the N receiving antennas in K tributaries and outputting the K delayed signals, where a $K^{th}$ tributary outputs a $K^{th}$ delayed signal and a delay quantity of the $K^{th}$ delayed signal is a product of a length of K−1 preamble subsequences and a symbol period time.

With reference to the first aspect, in a second possible implementation manner, the generating a first output signal by performing a correlation operation on the K delayed signals and a preamble subsequence includes: performing the correlation operation with the length of the preamble subsequence on each of the K delayed signals and the preamble subsequence to output K first signals, and generating the first output signal by multiplying the K first signals.

With reference to the first aspect, in a third possible implementation manner, the generating a second output signal by performing a correlation operation on each of the K delayed signals and each of the K delayed signals itself includes: performing the correlation operation with the length of the preamble subsequence on each of the K delayed signals and each of the K delayed signals itself to output K second signals, and generating the second output signal by multiplying the K second signals.

With reference to the first aspect or the foregoing possible implementation manners of the first aspect, in a fourth possible implementation manner, before the separately delaying a signal received from one of N receiving antennas in K tributaries, and outputting K delayed signals, the method further includes: receiving, by the N receiving antennas, transmitting signals sent by M transmitting antennas, where a preamble sequence of the transmitting signal sent by one of the M transmitting antennas is generated by the K preamble subsequences that are periodically arranged, the length of the preamble sequence is K times the length of the preamble subsequence, and M is a positive integer.

With reference to the first aspect or the foregoing possible implementation manners of the first aspect, in a fifth possible implementation manner, in a wireless system that uses the method, the number M of transmitting antennas of the wireless system is equal to or greater than 2, and the number N of receiving antennas of the wireless system is equal to or greater than 2, and a transmitter of the wireless system has more than two local oscillators, and a receiver of the wireless system has more than two independent local oscillators.

According to a second aspect, a frame synchronization apparatus of a wireless system is provided, including a delaying module, a signal correlation enhancing module, a relative frequency offset extracting module, and a cancelling module, where the delaying module, delaying module is configured to separately delay a signal received from one of N receiving antennas in K tributaries, and output K delayed signals, where N and K are positive integers; the signal correlation enhancing module is configured to generate a first output signal by performing a correlation operation on the K delayed signals and a preamble subsequence; the relative frequency offset extracting module is configured to generate a second output signal by performing the correlation operation on each of the K delayed signals output by the delaying module and each of the K delayed signals itself; and the cancelling module is configured to perform cancellation processing for the first output signal generated by the signal correlation enhancing module and the second output signal generated by the relative frequency offset extracting module to obtain a string of data stream, and obtain a maximum value of the string of data stream as a correlation peak, so as to determine a position of a frame header according to a time point corresponding to the correlation peak.

In a first possible implementation manner, the delaying module is specifically configured to separately delay the signal received from one of N receiving antennas in the K tributaries and output K delayed signals, where a $K^{th}$ tributary outputs a $K^{th}$ delayed signal, and a delay quantity of the $K^{th}$ delayed signal is a product of a length of K−1 preamble subsequences and a symbol period time.

With reference to the second aspect, in a second possible implementation manner, the signal correlation enhancing module is specifically configured to perform the correlation operation with the length of the preamble subsequence on each of the K delayed signals and the preamble subsequence to output K first signals, and generate the first output signal by multiplying the K first signals.

With reference to the second aspect, in a third possible implementation manner, the relative frequency offset extracting module is specifically configured to perform the correlation operation with the length of the preamble subsequence on each of the K delayed signals and each of the K delayed signals itself to output K second signals, and generate the second output signal by multiplying the K second signals.

With reference to the second aspect or the foregoing possible implementation manners of the second aspect, in a fourth possible implementation manner, a signal used by the delaying module is a transmitting signal sent by M transmitting antennas and is received by one of N receiving antennas, where a preamble sequence of the transmitting signal sent by one of the M transmitting antennas is generated by the K preamble subsequences that are periodically arranged, the length of the preamble sequence is K times the length of the preamble subsequence, and M is a positive integer.

With reference to the second aspect or the foregoing possible implementation manners of the second aspect, in a fifth possible implementation manner, in a wireless system that includes the apparatus, the number M of transmitting antennas of the wireless system is equal to or greater than 2, and the number N of receiving antennas of the wireless system is equal to or greater than 2, and a transmitter of the wireless system has more than two independent local oscillators, and a receiver of the wireless system has more than two independent local oscillators.

According to a third aspect, a wireless system is provided, including a transmitter, M transmitting antennas, N receiving antennas, and a receiver, where the receiver includes the frame synchronization apparatus of the wireless system: the transmitter is configured to generate a transmitting signal and send the signal to the M transmitting antennas; the M transmitting antennas are configured to send the transmitting signal to the N receiving antennas; the N receiving antennas are configured to receive the transmitting signal sent by the M transmitting antennas and send the signal to the receiver; and the receiver is configured to process a signal from one of the N receiving antennas, where the frame synchronization apparatus of the wireless system is configured to: separately delay the signal received from one of the N receiving antennas in K tributaries, and output K delayed signals, and N and K are positive integers; generate a first output signal by performing a correlation operation on the K delayed signals and a preamble subsequence; generate a second output signal by performing a correlation operation on each of the K delayed signals and each of the K delayed signals itself; and perform cancellation processing for the first output signal and the second output signal to obtain a string of data stream, and obtain a maximum value of the string of data stream as a correlation peak, so as to determine a position of a frame header according to a time point corresponding to the correlation peak.

In a first possible implementation manner, the N receiving antennas receive the transmitting signal transmitted from the M transmitting antennas, where a preamble sequence of the transmitting signal sent by one of the M transmitting antennas is generated by K preamble subsequences that are periodically arranged, the length of the preamble sequence is K times the length of the preamble subsequence, and M is a positive integer.

With reference to the third aspect or the first possible implementation manner of the third aspect, in a second possible implementation manner, the number M of transmitting antennas of the wireless system is equal to or greater than 2, and the number N of receiving antennas of the wireless system is equal to or greater than 2, and a transmitter of the wireless system has more than two independent local oscillators, and a receiver of the wireless system has more than two independent local oscillators.

According to the foregoing technical solutions, signal correlation may be enhanced and influence on the signal caused by aliasing of a frequency offset may be suppressed, and an obtained correlation peak can improve correctness of frame synchronization.

BRIEF DESCRIPTION OF DRAWINGS

To describe the technical solutions in embodiments of the present invention more clearly, the accompanying drawings required for describing the embodiments or the prior art are described briefly in the following. Apparently, the accompanying drawings in the following description merely show some embodiments of the present invention, and a person of ordinary skill in the art may still derive other drawings from these accompanying drawings without creative efforts.

DESCRIPTION OF EMBODIMENTS

The following clearly describes the technical solutions in embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention are applicable to various communication systems, such as a Global System for Mobile Communications (GSM, global system of mobile communication), a Code Division Multiple Access (CDMA, code division multiple access) system, a Wideband Code Division Multiple Access (WCDMA, wideband code division multiple access wireless) system, a General Packet Radio Service (GPRS, general packet radio service) system, and a Long Term Evolution (LTE, long term evolution) system.

A user equipment (UE, user equipment) is also known as a mobile terminal (mobile terminal), a mobile user equipment, and so on and can communicate with one or more core networks by using a radio access network (for example, an RAN, radio access network). The user equipment may be a mobile terminal, for example, a mobile phone (or called a "cellular" phone). The user equipment may also be a computer equipped with a mobile terminal, such as a portable, pocket-sized, handheld, computer-embedded, or vehicle-mounted mobile device. The mobile devices exchange voice and/or data with the radio access network.

A base station may be a Base Transceiver Station (BTS, base transceiver station) in the GSM or CDMA system, or a NodeB (NodeB) in the WCDMA system, or an evolutional NodeB (eNB or e-NodeB, evolutional Node B) in the LTE system, which is not limited in the present invention.

In addition, terms "system" and "network" herein can always be used interchangeably in this document. A term "and/or" herein just refers to a correlation of related objects, and represents that three relations may exist. For example, A and/or B may represent the following three conditions: only A exists, both A and B exist, and only B exists. In addition, a character "/" herein usually represents that former and latter objects associated are in an "or" relationship.

Figure 1:
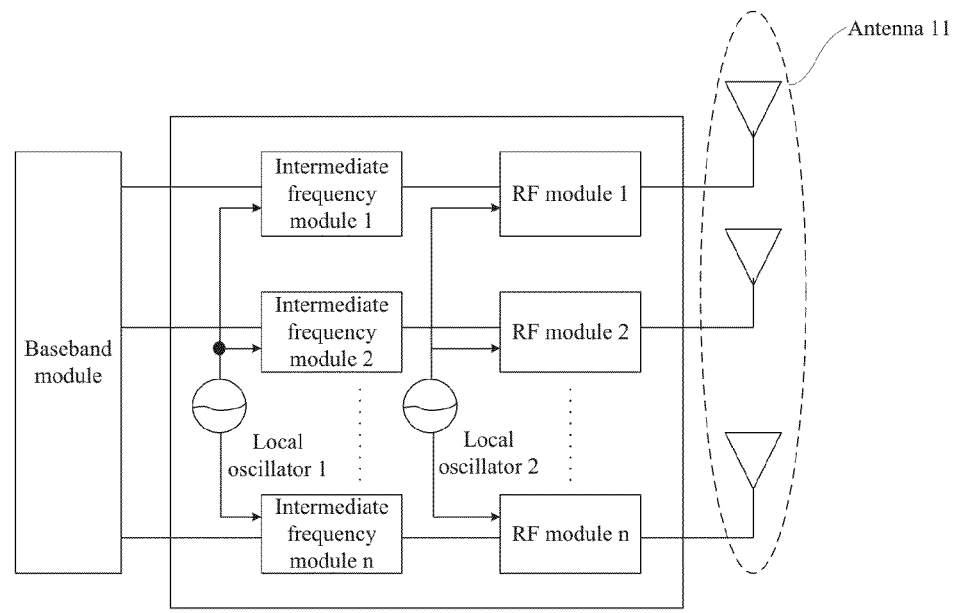
FIG. 1 is a schematic block diagram of a centralized MIMO system.

FIG. 1 is a schematic block diagram of a centralized MIMO system. A baseband module of the centralized MIMO system outputs n (n is an integer greater than 0) signals with a limited bandwidth and with a center frequency of 0, where each of the n signals with a limited bandwidth passes an intermediate frequency module and undergoes up-conversion to become an intermediate frequency signal with a limited bandwidth, and then passes a radio frequency module and undergoes the up-conversion to become a radio frequency signal with a limited bandwidth to transmit the radio frequency signal with a limited bandwidth to air by means of an antenna. The biggest characteristic of the centralized MIMO system is small spacing between a plurality of antennas (for example, an antenna 11 in FIG. 1). In the system, n intermediate frequency modules are arranged in a same position, n radio frequency modules and n antennas are arranged in another position different from the n intermediate frequency modules. The n intermediate frequency modules use a same local oscillator. For example, for a local oscillator 1 in FIG. 1, the n radio frequency modules use the same local oscillator. As shown in FIG. 1, a local oscillator signal of a radio frequency 1, a radio frequency 2, ..., and a radio frequency n is from a local oscillator 2.

Figure 2:
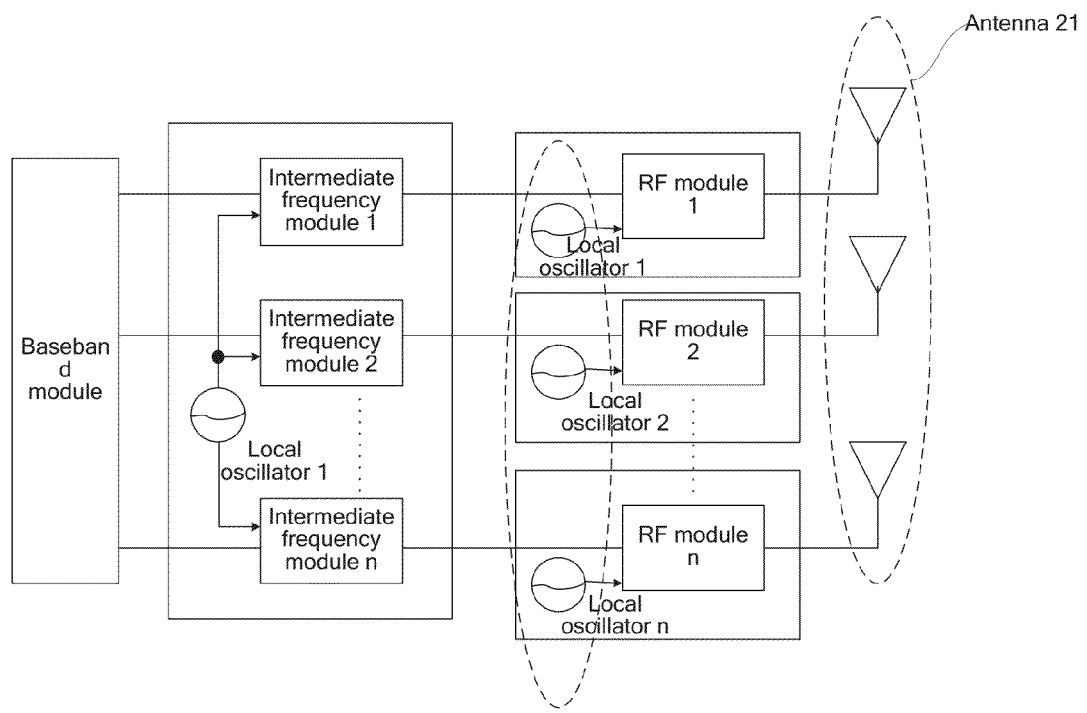
FIG. 2 is a schematic block diagram of a distributed MIMO system.

FIG. 2 is a schematic block diagram of a distributed MIMO system. A baseband module of the distributed MIMO system outputs n (n is an integer greater than 0) signals with a limited bandwidth and with a center frequency of 0, where each of the n signals with a limited bandwidth passes an intermediate frequency module and undergoes up-conversion to become an intermediate frequency signal with a limited bandwidth, and then passes a radio frequency module and undergoes the up-conversion to become a radio frequency signal with a limited bandwidth to transmit the radio frequency signal with a limited bandwidth to air by means of an antenna. Because n intermediate frequency modules of the distributed MIMO system are arranged in a same position, the n intermediate frequency modules use a same local oscillator, for example, a local oscillator 1 in FIG. 2. However, the biggest difference from a centralized MIMO system is that spacing between n antennas (for example, an antenna 21 in FIG. 2) in the distributed MIMO system is relatively large. Each antenna and each radio frequency module are integrated to constitute a subsystem. Therefore, each subsystem in n subsystems is arranged in a different position, each radio frequency module of n radio frequency modules uses a different local oscillator, for example, a local oscillator 1, a local oscillator 2, ..., and a local oscillator n. As shown in FIG. 2, a local oscillator signal of a radio frequency module 1 is from the local oscillator 1, by analogy, a local oscillator signal of a radio frequency module n is from a local oscillator N. Apparently, local oscillator signals of a radio frequency 1, a radio frequency 2, ..., and a radio frequency N are different.

The foregoing local oscillator differences between the distributed MIMO system and the centralized MIMO system cause the difference of a receiving signal between two MIMO systems.

A local oscillator frequency of a radio frequency has certain drift, which is known as a frequency offset, for example, 15 GHz±5 PPM (Parts Per Million, parts per million). Frequency offsets vary with local oscillators.

Figure 3:
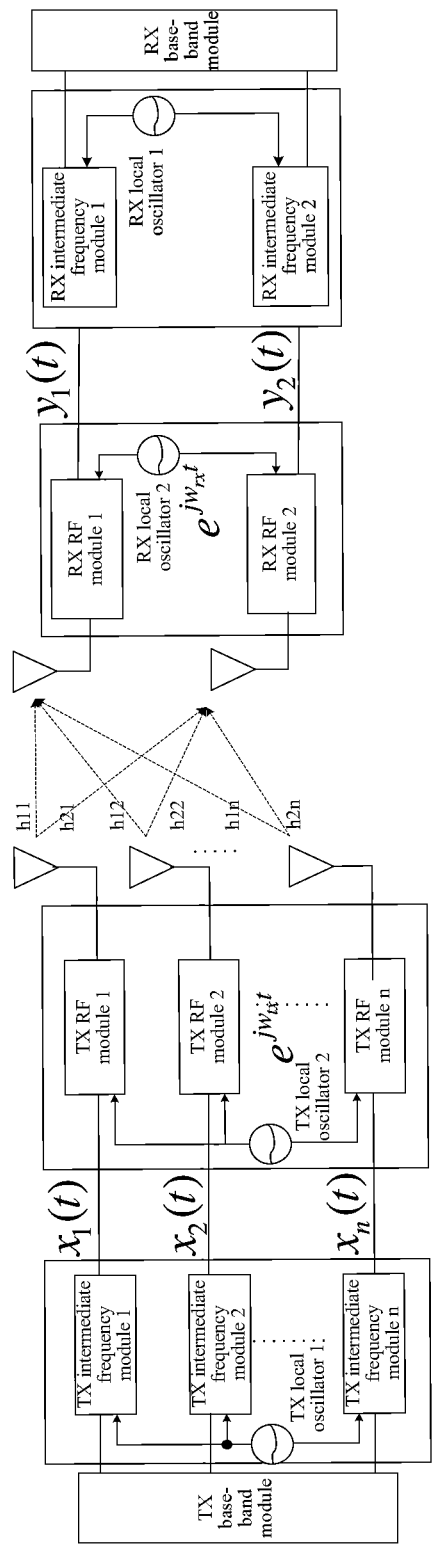
FIG. 3 is a schematic block diagram of signal receiving and transmitting of a centralized MIMO system.

For a centralized MIMO system, to simplify description, it is assumed that signals arrive at a receiving end at the same time. Referring to FIG. 3, FIG. 3 is a schematic block diagram of signal receiving and transmitting of the centralized MIMO system. For a signal process at a transmitting end (TX), refer to a description in FIG. 1. A signal process at the receiving end (RX) is a reverse process corresponding to that at the transmitting end. N radio frequency signals with a limited bandwidth received from air by each of a plurality of antennas pass a radio frequency module and undergo down-conversion to become an intermediate frequency signal with a limited bandwidth, and then pass an intermediate frequency module and undergo the down-conversion to become n signals with a limited bandwidth and with a center frequency of 0 to input to a baseband module of the centralized MIMO system.

In the centralized MIMO system, as shown in FIG. 3, $h_{11}$, $h_{21}$, $h1_2$, ... and $h_1$ and $h_{2n}$ are channel gain coefficients, $x_1(t)$, $x_2(t)$, ... and $x_n(t)$ are separately output intermediate frequency signals after up-conversion is performed on the intermediate frequency module at the transmitting end (TX), and $y_1(t)$, $y_2(t)$, . . . and $y_n(t)$ are separately output intermediate frequency signals after down-conversion is performed on the radio frequency module at the receiving end (RX).

Formula 1

$$y_1(t) = [h_{11}x_1(t)e^{jw_{tx}t} + h_{12}x_2(t)e^{jw_{tx}t} + \ldots + h_{1n}x_n(t)e^{jw_{tx}t}]e^{jw_{rx}t}$$
$$= [h_{11}x_1(t) + h_{12}x_2(t) + \ldots + h_{1n}x_n(t)]e^{jw_{rx}t}e^{jw_{tx}t}$$
$$= [h_{11}x_1(t) + h_{12}x_2(t) + \ldots + h_{1n}x_n(t)]e^{j(w_{rx}+w_{tx})t}$$

Formula 2

$$y_2(t) = [h_{21}x_1(t)e^{jw_{tx}t} + h_{22}x_2(t)e^{jw_{tx}t} + \ldots + h_{2n}x_n(t)e^{jw_{tx}t}]e^{jw_{rx}t}$$
$$= [h_{21}x_1(t) + h_{22}x_2(t) + \ldots + h_{2n}x_n(t)]e^{jw_{rx}t}e^{jw_{tx}t}$$
$$= [h_{21}x_1(t) + h_{22}x_2(t) + \ldots + h_{2n}x_n(t)]e^{j(w_{rx}+w_{tx})t}$$

The frequency offset at the receiving end (RX) has only one $e^{j(w_{rx}+w_{tx})t}$.

An SISO system is similar to a centralized MIMO system and a signal correlation (correlation) is usually used for frame synchronization. A formula of correlation operation (correlation operation) in a method of signal correlation is as follows:

Output signal=Input signal×Conjugation of input signal

A maximum value of a result of the correlation operation, also known as a correlation peak, serves as a maximum value of frame synchronization. A position of a frame header is determined according to a time point corresponding to the correlation peak, which is used for framing and deframing in frame synchronization.

Figure 4:
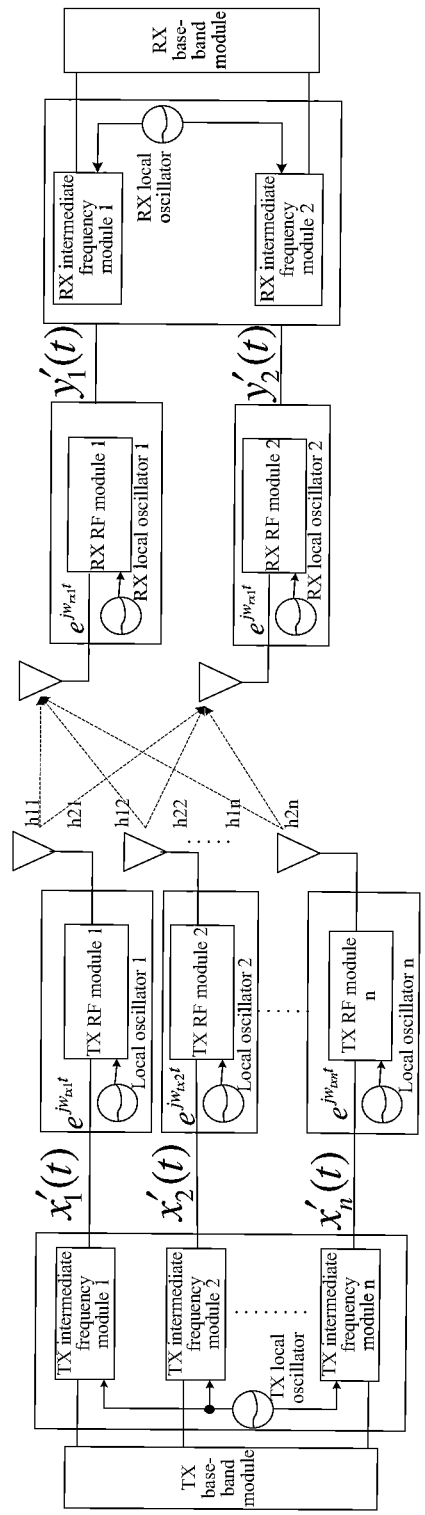
FIG. 4 is a schematic block diagram of signal receiving and transmitting of a distributed MIMO system.

For a distributed MIMO system, to simplify description, it is assumed that a signal arrives at a receiving end at the same time. Referring to FIG. 4, FIG. 4 is a schematic block diagram of signal receiving and transmitting of the distributed MIMO system. For a signal process at a transmitting end (TX), refer to a description in FIG. 2. A signal process at the receiving end (RX) is a reverse process corresponding to that at the transmitting end. N radio frequency signals with a limited bandwidth received from air by each of a plurality of antennas pass a radio frequency module and undergo down-conversion to become an intermediate frequency signal with a limited bandwidth, and then pass an intermediate frequency module and undergo the down-conversion to become n signals with a limited bandwidth and with a center frequency of 0 to input to a baseband module of the distributed MIMO system.

In the distributed MIMO system, as shown in FIG. 4, $h_{11}$, $h_{21}$, $h_{12}$, . . . and $h_{1n}$ and $h_{2n}$ are channel gain coefficients, $x_1'(t)$, $x_2'(t)$, . . . and $x_n'(t)$ are separately output intermediate frequency signals after up-conversion is performed on the intermediate frequency module at the transmitting end (TX), and $y_1'(t)$, $y_2'(t)$, . . . and $y_n'(t)$ are separately output intermediate frequency signals after down-conversion is performed on the radio frequency module at the receiving end (RX).

$$y_1'(t) = [h_{11}x_1'(t)e^{jw_{tx1}t} + h_{12}x_2'(t)e^{jw_{tx2}t} + \ldots + h_{1n}x_n'(t)e^{jw_{txn}t}]e^{jw_{rx1}t}$$

Formula 3

$$y_2'(t) = [h_{21}x_1'(t)e^{jw_{tx1}t} + h_{22}x_2'(t)e^{jw_{tx2}t} + \ldots + h_{2n}x_n'(t)e^{jw_{txn}t}]e^{jw_{rx2}t}$$

Formula 4

In the distributed MIMO system, each of n radio frequency channels has an independent local oscillator, and each local oscillator has an independent frequency offset. When a signal is transmitted from an antenna, the signal has aliasing of frequency offsets with the local oscillator. A receiving antenna receives aliasing signals transmitted by a plurality of transmitting antennas (refer to formula 3 or 4). The frequency offset at the receiving end is not correlated and cannot be separated after signal aliasing, causing a decrease in signal correlation. At this time, if an existing frame synchronization method is used to generate a correlation peak, an output correlation peak is not stable, causing a frame synchronization error.

Frame synchronization is a key step of baseband system processing at the receiving end. Other steps such as channel estimation, frequency offset estimation, and payload extracting can be only implemented after the frame synchronization.

Figure 5:
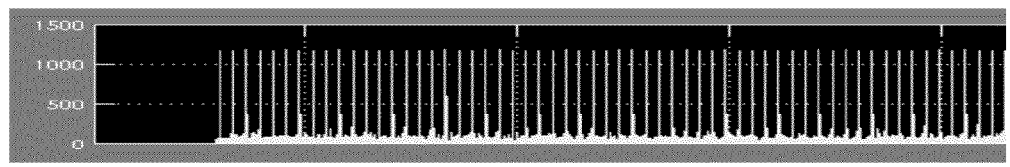
FIG. 5 is a schematic diagram of a correlation peak obtained by using an existing frame synchronization method in a centralized MIMO system.

FIG. 5 is a schematic diagram of a correlation peak obtained by using an existing frame synchronization method in a centralized MIMO system. In the case of a centralized MIMO system architecture, a correlation peak obtained by performing a correlation (correlation) operation is shown in FIG. 5. The correlation peak is stable and is a single pulse. In a framing process, it is easy and simple to detect the correlation peak.

Figure 6A:
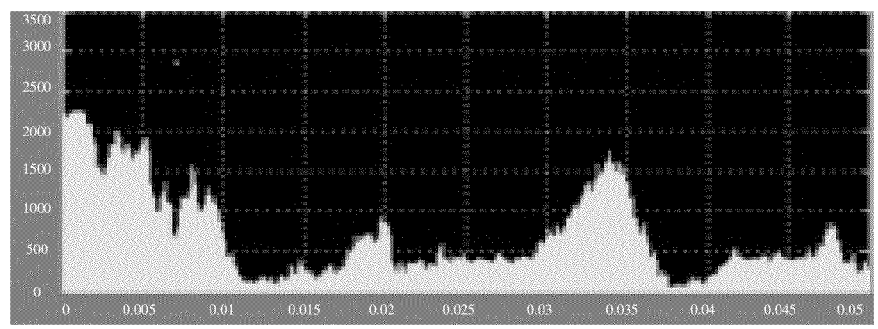
FIG. 6A and FIG. 6B are schematic diagrams of correlation peaks obtained by using an existing frame synchronization method in a distributed MIMO system.
Figure 6B:
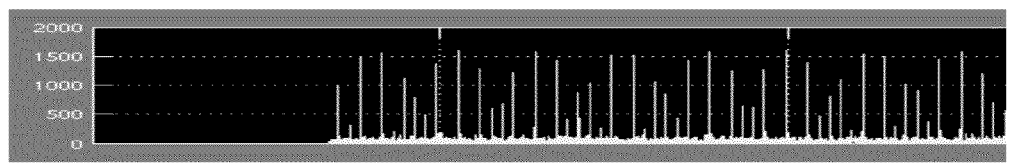

FIG. 6A and FIG. 6B are schematic diagrams of correlation peaks obtained by using an existing frame synchronization method in a distributed MIMO system. In the distributed MIMO, the distributed MIMO is substantially sensitive to a mixing frequency offset, an output correlation peak is affected by the mixing frequency offset, an amplitude fluctuates significantly, and the peak does not exist in a certain position, and a frame synchronization effect is poor. In a 4*4MIMO system with a relative frequency offset of 300 Khz, a correlation peak obtained by performing a correlation (correlation) operation is shown in FIG. 6A and FIG. 6B. FIG. 6A is a schematic diagram of a maximum correlation operation peak result obtained by using the existing frame synchronization method and performing the correlation operation on a preamble sequence after the correlation operation has been performed within a period of time. FIG. 6B is a partial enlarged drawing of FIG. 6A. It can be seen that a generated peak is affected by aliasing of a frequency offset, a result is not stable, and even no peak exists in a certain position, which may cause a framing result error.

It can be seen from above that, an effect of using a signal correlation (correlation) method for frame synchronization in an SISO system or a centralized MIMO system is good. However, an aliasing frequency offset of a distributed MIMO system causes a decrease in signal correlation. Therefore, an effect of the foregoing frame synchronization method is poor in the distributed MIMO system.

Embodiments of the present invention provide a frame synchronization method and an apparatus, which can efficiently solve a frame synchronization problem of a distributed MIMO system.

Figure 7:
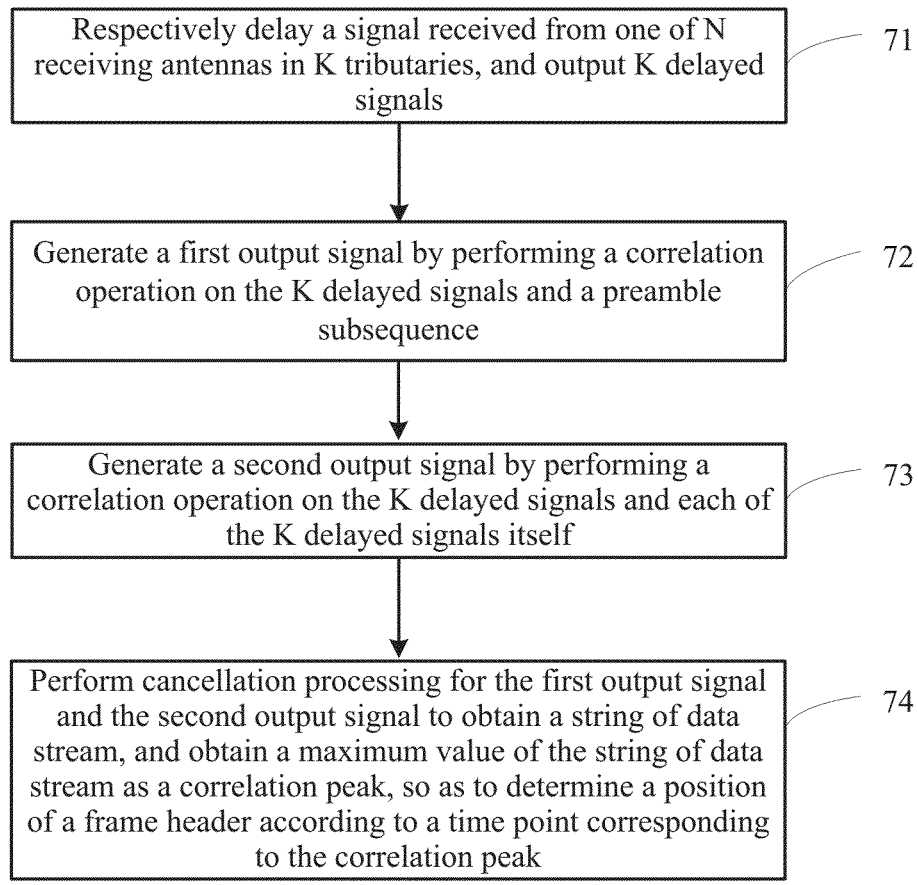
FIG. 7 is a schematic flowchart of a frame synchronization method of a wireless system according to an embodiment of the present invention.

FIG. 7 is a schematic flowchart of a frame synchronization method 70 of a wireless system according to an embodiment of the present invention.

S71. Separately delay a signal received from one of N receiving antennas in K tributaries, and output K delayed signals, where N and K are positive integers.

S72. Generate a first output signal by performing a correlation operation on the K delayed signals and a preamble subsequence.

S73. Generate a second output signal by performing the correlation operation on each of the K delayed signals and each of the K delayed signals itself.

S74. Perform cancellation processing for the first and the second output signals to obtain a string of data stream, and obtain a maximum value of the string of data stream as a correlation peak, so as to determine a position of a frame header according to a time point corresponding to the correlation peak.

In this embodiment of the present invention, a first signal is obtained by multiplying results of multiple correlation operations on a receiving signal and a known sequence, and the number of multiplications is determined by the number of repetitions K of a preamble subsequence, which enhances signal correlation and also increases influence of a frequency offset on the signal correlation; then, a second signal is obtained by performing a plurality of correlation operation result multiplications of a signal and itself, and the number of multiplications is determined by the number of repetitions K of the preamble subsequence, which amplifies influence of a relative frequency offset on the signal correlation; finally, cancellation processing is performed on the first signal and the second signal to eliminate influence of the relative frequency offset on a signal correlation operation result, so as to suppress influence on a signal caused by aliasing of a frequency offset by means of improvement of the signal correlation. An obtained correlation peak can improve correctness of frame synchronization.

Figure 8:
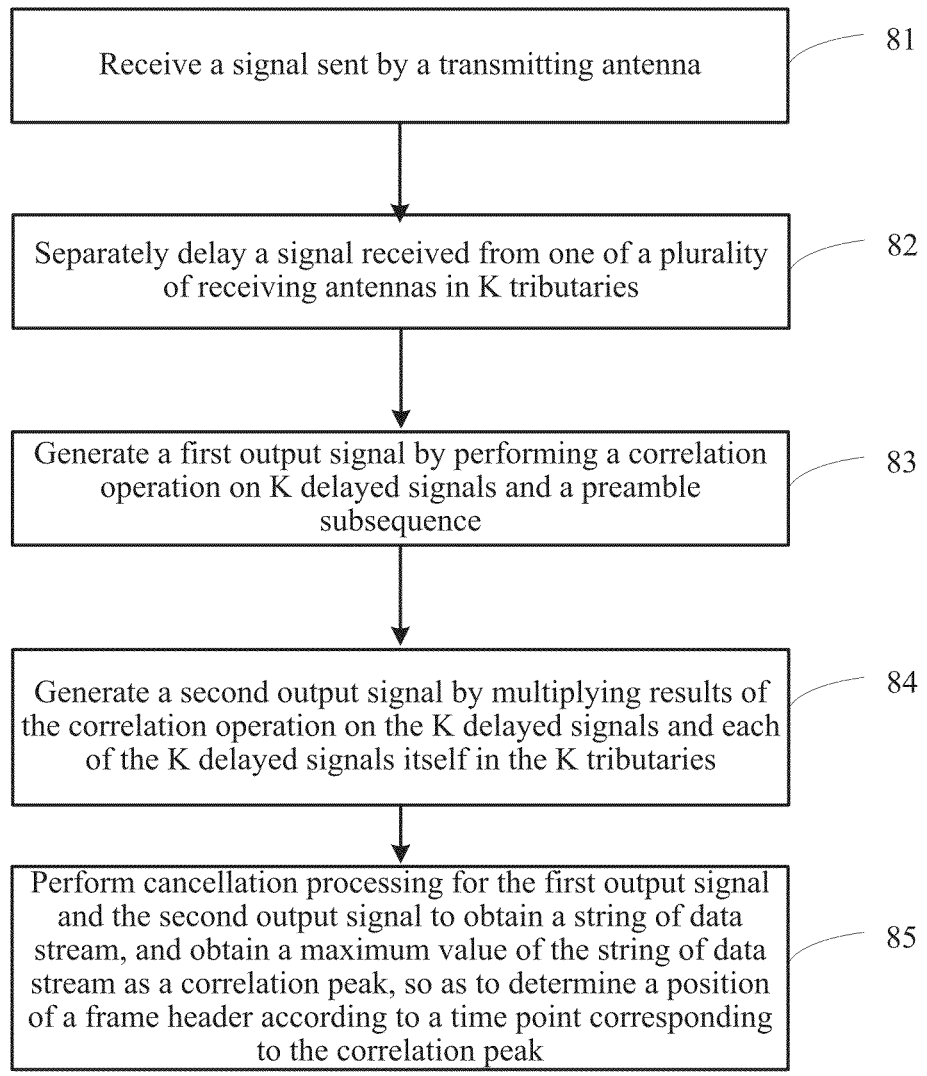
FIG. 8 is a schematic flowchart of a frame synchronization method of a wireless system according to another embodiment of the present invention.

FIG. 8 is a schematic flowchart of a frame synchronization method 80 of a wireless system according to another embodiment of the present invention.

S81. Receive a signal transmitted by a transmitting antenna.

Figure 9:
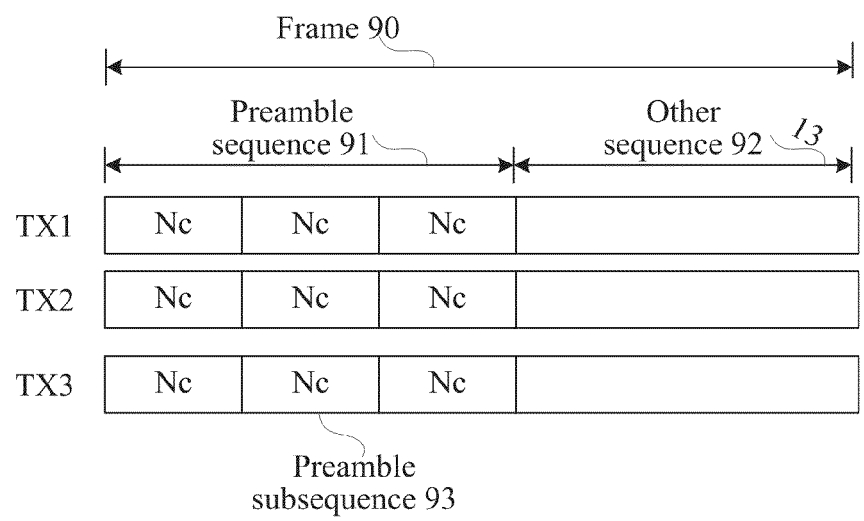
FIG. 9 is a schematic diagram of a frame structure 90 of a transmitting signal according to an embodiment of the present invention.

An M*N distributed MIMO system is used as an example, where the system has M transmitting antennas and N receiving antennas. FIG. 9 is a schematic diagram of a frame structure 90 of a transmitting signal according to an embodiment of the present invention. For ease of description, a frame structure of signals sent by transmitting antennas TX1 to TX3 when M is equal to 3 is used as an example. As shown in FIG. 9, a frame 90 includes one preamble sequence 91 and several other sequences 92. Nc is a length of a preamble subsequence 93. A preamble subsequence forms a preamble sequence by using a plurality of cyclic repetitions. A total length of the preamble sequence is K*Nc, where K is the number of repetitions of the preamble sequence and is a positive integer. A transmitter of a distributed MIMO system has a preamble subsequence generator and a preamble circulator. The preamble subsequence generator is configured to generate a preamble subsequence in a cycle of Nc. The generated preamble subsequence enters the preamble circulator to replicate the preamble subsequence for K times to generate the preamble sequence with K circles and a total length of K*Nc.

In the distributed MIMO system, each of N receiving antennas receives a transmitting signal sent by a transmitter. A correlation of the preamble sequence decreases due to influence of aliasing of a relative frequency offset of the M*N distributed MIMO system. In the following description, in an embodiment of the present invention, three modules, namely, a signal correlation enhancing module, a relative frequency offset extracting module, and a cancelling module, are configured to compensate a correlation of a preamble sequence signal.

S82. Separately delay a signal received by one of a plurality of receiving antennas in K tributaries.

Separately delay the signal received by one receiving antenna in the K tributaries and then output K delayed signals, where a $K^{th}$ tributary outputs a $K^{th}$ delayed signal. For example, a delay quantity of a first delayed signal that is delayed and output in a first tributary is 0, a delay quantity of a second delayed signal that is delayed and output in a second tributary is Nc*t (Nc multiplied by t), a delay quantity of a third delayed signal that is delayed and output in a third tributary is 2*Nc*t, . . . , a delay quantity of a $K^{th}$ delayed signal that is delayed and output in a $K^{th}$ tributary is (K−1)*Nc*t. Where, K is the number of repetitions of the preamble sequence and is a positive integer, and t is a symbol period time during baseband processing. Referring to a description in S81, in the distributed MIMO system, the number of repetitions K of the preamble subsequence is preset, causing a baseband module at a receiving end to determine a tributary quantity K of processing signals according to the number of repetitions of the preamble subsequence.

S83. Generate a first output signal by performing a correlation operation on the K delayed signals and the preamble subsequence.

K signals with different delay quantities enter the signal correlation enhancing module. Steps performed by the correlation enhancing module for processing the K signals with different delay quantities include: performing the correlation (correlation) operation with a length of Nc on the signal with each of K different delay quantities and the preamble subsequence to obtain K output results of the correlation operation, where the output results are also known as first signals in the context; meanwhile, generating a first output signal by multiplying the K first signals. The first output signal enhances correlation of a receiving signal and improves influence of a relative frequency offset on correlation of a receiving signal. The first output signal is, for example, a numerator, numerator in formula 5 of a specific embodiment shown in step S85. Where, $r_j(d+m)$ is a signal received at a time point of (d+m) from the $j^{th}$ receiving antenna at the receiving end, where d is a sampling time point, M indicates a count of sequences used for the correlation operation, with a value of Nc symbols in total ranging from 0 to (Nc−1); Ci is a preamble subsequence and Ci* is a conjugation of the preamble subsequence.

S84. Generate a second output signal by separately multiplying a result of the correlation operation on the K delayed signals and the K delayed signals themselves in the K tributaries.

In addition, the K signals with different delay quantities further enter the relative frequency offset extracting module. The relative frequency offset extracting module is configured to extract a correlation value of a relative frequency offset. It should be noted that the correlation value of the relative frequency offset, instead of the relative frequency offset itself, is extracted. The correlation value of the relative frequency offset is used to perform a division operation, in the cancelling module, with an output result from the correlation enhancing module, to offset a part of a relative frequency offset correlation that is enhanced simultaneously when signal correlation is enhanced.

Specific implementation steps include: perform the correlation operation with the length of Nc on each of K signals with different delay quantities and itself to obtain K output results of the correlation operation, where the output results are also known as second signals in the context; meanwhile, generate the second output signal by multiplying the K second signals. The obtaining of the second output signal enhances a part of influence by the relative frequency offset on receiving signal correlation. The second output signal is, for example, a denominator in formula 5 of a specific embodiment shown in step S85.

S85. Perform cancellation processing for the first output signal and the second output signal to obtain a string of data stream, and obtain a maximum value of the string of data stream as a correlation peak, so as to determine a position of a frame header according to a time point corresponding to the correlation peak.

In the cancelling module, perform a division operation for results obtained in steps S83 and S84 to obtain the string of data stream. In the string of data stream, obtain the maximum value as the correlation peak, so as to obtain the correlation peak used by a signal, in which influence of the relative frequency offset is finally eliminated, in frame synchronization. The position of a frame header is determined according to a time point corresponding to the correlation peak, thereby implementing framing and deframing of the frame synchronization.

An operation formula is as follows: A 3*3 distributed MIMO system is used as an example.

$$\text{peak} = \frac{\sum_{m=0}^{Nc-1} r_j(d+m)c_i^*(d) \sum_{m=0}^{Nc-1} r_j(d+m+Nc)c_i^*(d) \sum_{m=0}^{Nc-1} r_j(d+m+2Nc)c_i^*(d)}{\sum_{m=0}^{Nc-1} r_j(d+m)r_j^*(d+m) \sum_{m=0}^{Nc-1} r_j(d+m+Nc)r_j^*(d+m+Nc) \sum_{m=0}^{Nc-1} r_j(d+m+2Nc)r_j^*(d+m+2Nc)} \quad \text{Formula 5}$$

Where, $r_j(d+m)$ is a signal received at a time point of (d+m) from the $j^{th}$ receiving antenna at the receiving end, d and m are positive integers, and peak indicates the correlation peak.

By using the foregoing method, signal correlation is enhanced, and influence of aliasing of a frequency offset in the distributed MIMO system is suppressed, which provides an excellent correlation peak for frame synchronization. The method has a prominent improvement on frame synchronization in the existing distributed MIMO system. However, this method is also applicable to the SISO system or the centralized MIMO system. Compared with the prior art used in the SISO system or the centralized MIMO system, the correlation peak of relative output of frame synchronization is improved and an effect of frame synchronization is improved by dividing a product obtained by performing the correlation operation on each of the K delayed signals and the preamble subsequence in the K tributaries by a product obtained by performing the correlation operation on each of the K delayed signals and the K delayed signals themselves in the K tributaries.

In this embodiment of the present invention, a first signal is obtained by multiplying results of multiple correlation operations on a receiving signal and a known sequence, and the number of multiplications is determined by the number of repetitions K of a preamble subsequence, which enhances signal correlation and also increases influence of a frequency offset on the signal correlation; then, a second signal is obtained by performing a plurality of correlation operation result multiplications of a signal and itself, and the number of multiplications is determined by the number of repetitions K of the preamble subsequence, which amplifies influence of a relative frequency offset on the signal correlation; finally, cancellation processing is performed on the first signal and the second signal to eliminate influence of the relative frequency offset on a signal correlation operation result, so as to suppress influence on a signal caused by aliasing of a frequency offset by means of improvement of the signal correlation. An obtained correlation peak can improve correctness of frame synchronization.

Figure 10:
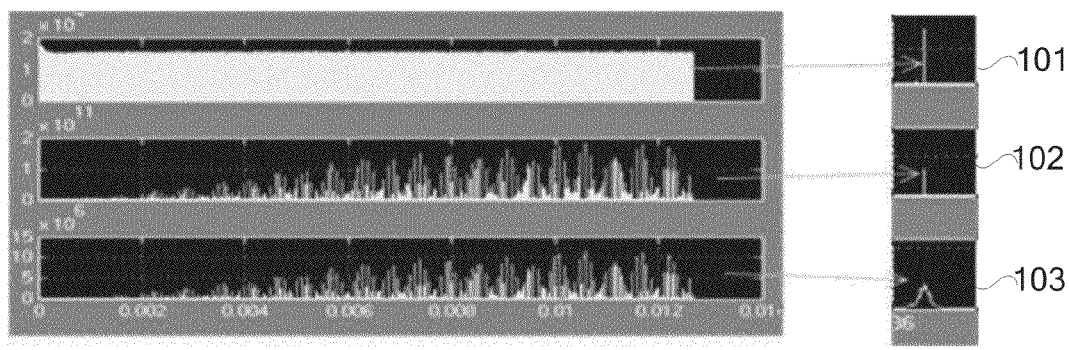
FIG. 10 is a schematic diagram of an effect of a frame synchronization method of a wireless system according to an embodiment of the present invention.

FIG. 10 is a schematic diagram of an effect of a frame synchronization method of a wireless system according to an embodiment of the present invention. The method is applied in a 4*4 MIMO system with a relative frequency offset of 300 Khz, as shown in FIG. 10. The figure on the left shows all generated results and an enlarged drawing is on the right. From top to bottom, there are a correlation peak output 101, a first output signal 102 output by a signal correlation enhancing module, and a second output signal 103 output by a relative frequency offset extracting. The correlation peak output 101, as shown in FIG. 10, becomes flat, which facilitates framing.

Figure 11:
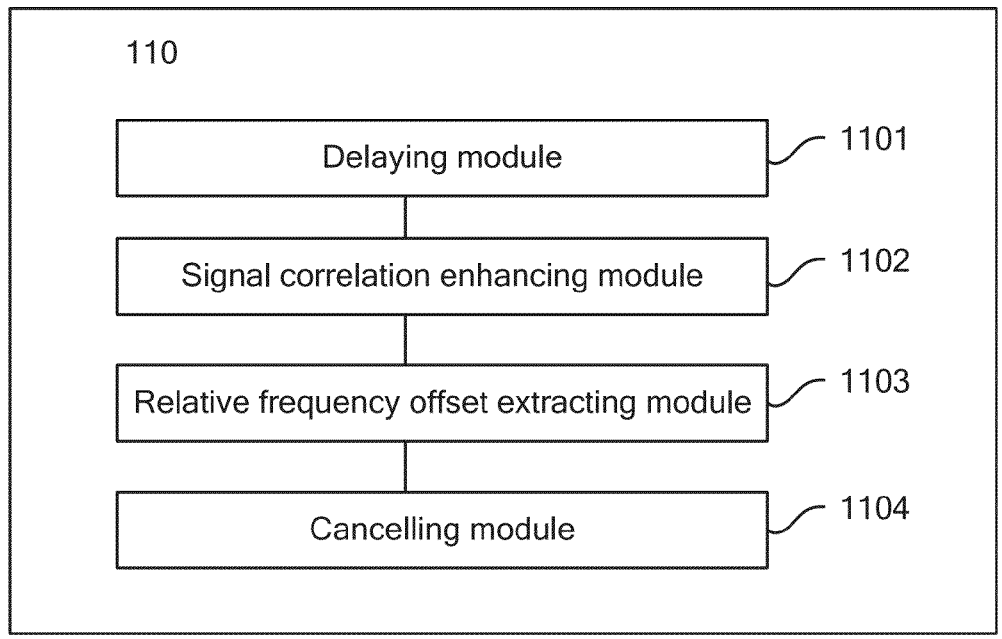
FIG. 11 is a schematic block diagram of a frame synchronization apparatus of a wireless system according to an embodiment of the present invention.

FIG. 11 is a schematic block diagram of a frame synchronization apparatus 110 according to an embodiment of the present invention. The apparatus 110 includes: a delaying module 1101, a signal correlation enhancing module 1102, a relative frequency offset extracting module 1103, and a cancelling module 1104.

The delaying module 1101 separately delays a signal received from one of N receiving antennas in K tributaries, and outputs K delayed signals, where N and K are positive integers.

The signal correlation enhancing module 1102 generates a first output signal by performing a correlation operation on the K delayed signals output by the delaying module 1101 and a preamble subsequence.

The relative frequency offset extracting module 1103 generates a second output signal by performing the correlation operation on each of the K delayed signals output by the delaying module 1101 and each of the K delayed signals itself.

The cancelling module 1104 performs cancellation processing for the first output signal generated by the signal correlation enhancing module 1102 and the second output signal generated by the relative frequency offset extracting module 1103 to obtain a string of data stream, and obtains a maximum value of the string of data stream as a correlation peak, so as to determine a position of a frame header according to a time point corresponding to the correlation peak.

The apparatus 110 implements the method 70. For brevity, details are not described herein again.

This embodiment of the present invention provides a frame synchronization apparatus, where a first signal is obtained by multiplying results of multiple correlation operations on a receiving signal and a known sequence, and the number of multiplications is determined by the number of repetitions K of a preamble subsequence, which enhances signal correlation and also increases influence of a frequency offset on the signal correlation; then, a second signal is obtained by performing a plurality of correlation operation result multiplications of a signal and itself, and the number of multiplications is determined by the number of repetitions K of the preamble subsequence, which amplifies influence of a relative frequency offset on the signal correlation; finally, cancellation processing is performed on the first signal and the second signal to eliminate influence of the relative frequency offset on a signal correlation operation result, so as to suppress influence on a signal caused by aliasing of a frequency offset by means of improvement of the signal correlation. An obtained correlation peak can improve correctness of frame synchronization.

Figure 12:
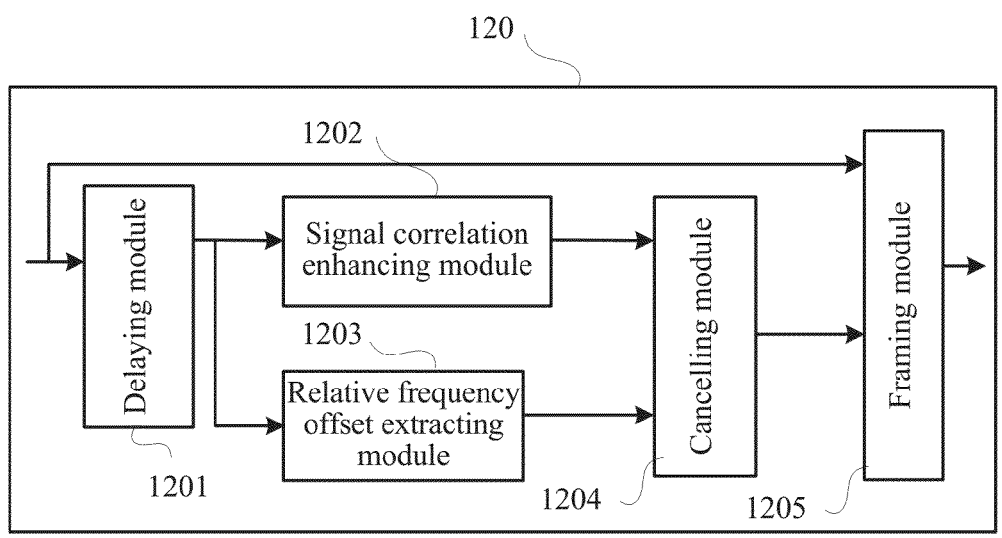
FIG. 12 is a schematic block diagram of a frame synchronization apparatus of a wireless system according to another embodiment of the present invention.

FIG. 12 is a schematic block diagram of a frame synchronization apparatus 120 of a wireless system according to another embodiment of the present invention. The apparatus 120 has a delaying module 1201, a signal correlation enhancing module 1202, a relative frequency offset extracting module 1203, and a cancelling module 1204, which are respectively the same as or similar to a delaying module 1101, a signal correlation enhancing module 1102, a relative frequency offset extracting module 1103, and a cancelling module 1104 of an apparatus 110. The difference is that the apparatus 120 further includes a framing module 1205.

Optionally, the delaying module 1201 is specifically configured to separately delay a signal received from one of N receiving antennas in K tributaries and output K delayed signals, where a $K^{th}$ tributary outputs a $K^{th}$ delayed signal and a delay quantity of the $K^{th}$ delayed signal is a product of a length of K−1 preamble subsequences and a symbol period time.

Optionally, the signal correlation enhancing module 1202 is specifically configured to perform a correlation operation with a length of the preamble subsequence on each of the K delayed signals and a preamble subsequence to output K first signals, and generate a first output signal by multiplying the K first signals.

Optionally, the relative frequency offset extracting module 1203 is specifically configured to perform the correlation operation with the length of the preamble subsequence on each of the K delayed signals and each of the K delayed signals itself to output K second signals, and generate a second output signal by multiplying the K second signals.

Optionally, a signal used by the delaying module 1201 is a transmitting signal that is sent by M transmitting antennas and received by one of the N receiving antennas, where a preamble sequence of the transmitting signal sent by one of the M transmitting antennas is generated by K preamble subsequences that are periodically arranged, a length of the preamble sequence is K times a length of the preamble subsequence, and M is a positive integer.

Optionally, in a wireless system that includes the apparatus, the number M of transmitting antennas of the wireless system is equal to or greater than 2, and the number N of receiving antennas of the wireless system is equal to or greater than 2, and a transmitter of the wireless system has more than two independent local oscillators, and a receiver of the wireless system has more than two independent local oscillators.

Optionally, the framing module 1205 performs framing and outputs frame structure information according to the correlation peak obtained by the cancelling module 1204.

As an implementation manner, the apparatus 120 may be a frame synchronization apparatus in a wireless communication system, or a receiver that includes the frame synchronization apparatus. The apparatus 120 implements a method 80. For brevity, details are not described herein again.

This embodiment of the present invention provides a frame synchronization apparatus, where a first signal is obtained by multiplying results of multiple correlation operations on a receiving signal and a known sequence, and the number of multiplications is determined by the number of repetitions K of a preamble subsequence, which enhances signal correlation and also increases influence of a frequency offset on the signal correlation; then, a second signal is obtained by performing a plurality of correlation operation result multiplications of a signal and itself, and the number of multiplications is determined by the number of repetitions K of the preamble subsequence, which amplifies influence of a relative frequency offset on the signal correlation; finally, cancellation processing is performed on the first signal and the second signal to eliminate influence of the relative frequency offset on a signal correlation operation result, so as to suppress influence on a signal caused by aliasing of a frequency offset by means of improvement of the signal correlation. An obtained correlation peak can improve correctness of frame synchronization.

Figure 13:
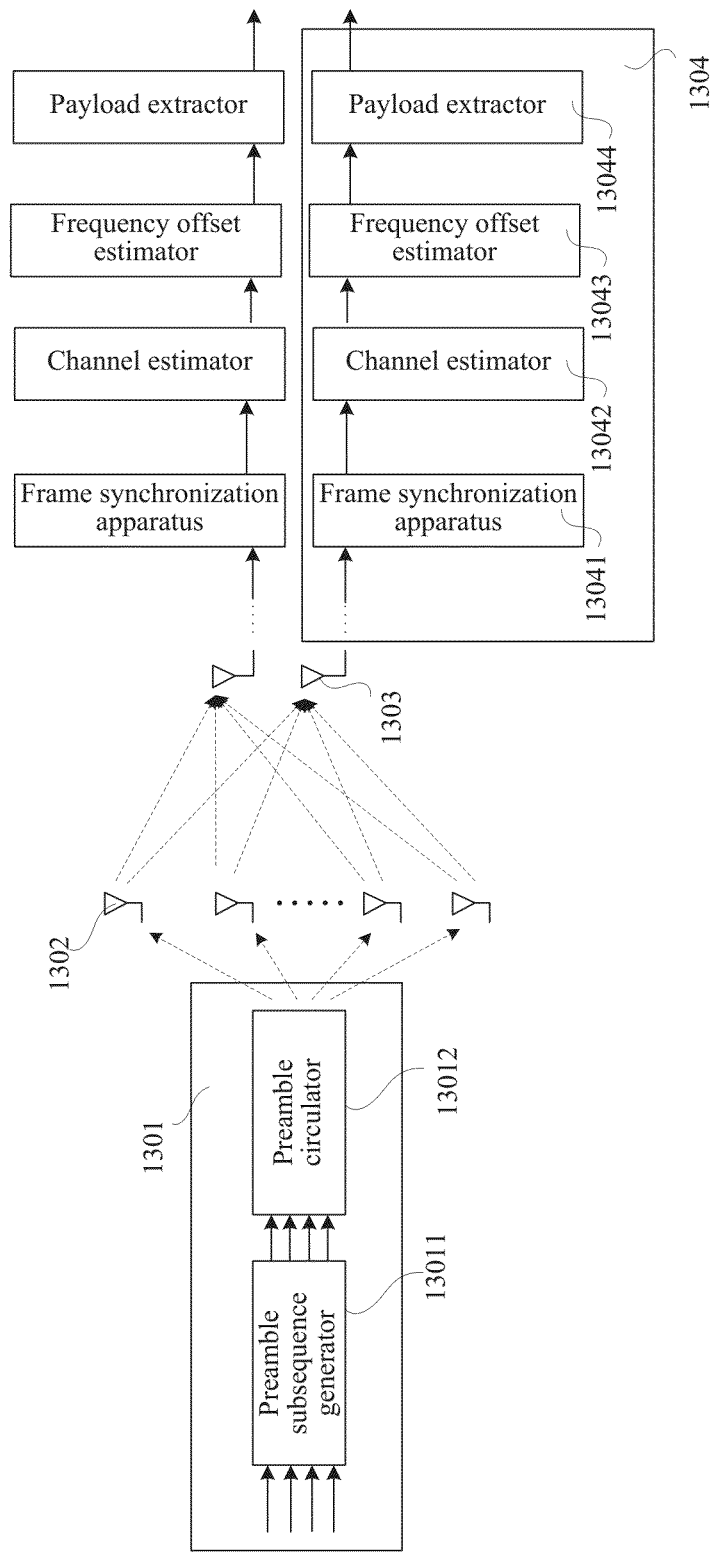
FIG. 13 is a schematic block diagram of a wireless system according to an embodiment of the present invention.

FIG. 13 is a schematic block diagram of a wireless system 130 according to an embodiment of the present invention. The wireless system 130 includes a transmitter 1301, M transmitting antennas 1302, N receiving antennas 1303, and a receiver 1304. Where, the transmitter 1301 may include a preamble subsequence generator 13011, a preamble circulator 13012, and so on. The receiver 1304 may include a frame synchronization apparatus 13041, a channel estimator 13042, a frequency offset estimator 13043, a payload extractor 13044, and so on. The frame synchronization apparatus 13041 is the same as or similar to the apparatus 120 or 110.

The transmitter is configured to generate a transmitting signal and send the signal to M transmitting antennas; the M transmitting antennas are configured to send the transmitting signal to N receiving antennas; the N receiving antennas are configured to receive the transmitting signal sent by the M transmitting antennas and send the signal to the receiver; the receiver is configured to process the signal from one of the N receiving antennas, where the frame synchronization apparatus is configured to: separately delay the signal received from one of the N receiving antennas in K tributaries and output K delayed signals, and N and K are positive integers; generate a first output signal by performing a correlation operation on the K delayed signals and a preamble subsequence; generate a second output signal by performing the correlation operation on each of the K delayed signals and each of the K delayed signals itself; perform cancellation processing for the first output signal and the second output signal to obtain a string of data stream, and obtain a maximum value of the string of data stream as a correlation peak, so as to determine a position of a frame header according to a time point corresponding to the correlation peak.

Specifically, as shown in FIG. 13, the transmitter 1301, by using the preamble subsequence generator 13011 and the preamble circulator 13012, generates K circles and preamble sequences with a total length of K*Nc, where Nc is a length of a preamble subsequence. The preamble sequence and other sequences are included in a frame structure of the transmitting signal, and are sent to the receiving antenna 1303 by using the transmitting antenna 1302 as the transmitting signal. The receiver receives the signal received by the receiving antenna 1303. The signal is processed by the frame synchronization apparatus 13041, the correlation peak of frame synchronization is generated by relative detections of preamble sequence of a frame. Based on a peak signal, the receiving signal is framed, and frame structure information is output in a framing result. The frame structure information is subsequently used by the channel estimator 13042, the frequency offset estimator 13043, and the payload extractor 13044 for further extracting specific data from the received signal.

The wireless system 130 that uses the frame synchronization method and/or apparatus of the embodiments of the present invention may be an SISO system, a centralized MIMO system, or a distributed MIMO system, where, the number M of transmitting antennas of the wireless system in the centralized MIMO system or the distributed MIMO system is equal to or greater than 2, and the number N of receiving antennas of the wireless system is equal to or greater than 2. Preferably, in the distributed MIMO system, the transmitter of the wireless system has two or more independent local oscillators, and the receiver of the wireless system has two or more independent local oscillators.

The frame synchronization method and apparatus in the embodiments of the present invention can improve signal correlation, suppress influence on a signal caused by aliasing of a frequency offset, and an obtained correlation peak can improve correctness of frame synchronization.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A frame synchronization method of a wireless system, comprising:
separately delaying a signal received from one of N receiving antennas in K tributaries, and outputting K delayed signals, wherein N and K are positive integers;
generating a first output signal by performing a correlation operation on the K delayed signals and a preamble subsequence;
generating a second output signal by performing a correlation operation on each of the K delayed signals and each of the K delayed signals itself; and
performing cancellation processing on the first output signal and the second output signal to obtain a string of data stream, and obtaining a maximum value of the string of data stream as a correlation peak, so as to determine a position of a frame header according to a time point corresponding to the correlation peak.

2. The method according to claim 1, wherein the separately delaying a signal received from one of N receiving antennas in K tributaries, and outputting K delayed signals comprises:
separately delaying the signal received from one of the N receiving antennas in the K tributaries and outputting the K delayed signals, wherein a Kth tributary outputs a Kth delayed signal and a delay quantity of the Kth delayed signal is a product of a length of K−1 preamble subsequences and a symbol period time.

3. The method according to claim 1, wherein the generating a first output signal by performing a correlation operation on the K delayed signals and a preamble subsequence comprises:
performing a correlation operation with the length of the preamble subsequence on each of the K delayed signals and the preamble subsequence to output K first signals, and generating the first output signal by multiplying the K first signals.

4. The method according to claim 1, wherein the generating a second output signal by performing a correlation operation on each of the K delayed signals and each of the K delayed signals itself comprises:
performing a correlation operation with the length of the preamble subsequence on each of the K delayed signals and each of the K delayed signals itself to output K second signals, and generating the second output signal by multiplying the K second signals.

5. The method according to claim 1, wherein before the separately delaying a signal received from one of N receiving antennas in K tributaries, and outputting K delayed signals, the method further comprises:
receiving, by the N receiving antennas, transmitting signals sent by M transmitting antennas, wherein a preamble sequence of the transmitting signal sent by one of the M transmitting antennas is generated by the K preamble subsequences that are periodically arranged, a length of the preamble sequence is K times the length of the preamble subsequence, and M is a positive integer.

6. The method according to claim 5, wherein: in a wireless system that uses the method, the number M of transmitting antennas of the wireless system is equal to or greater than 2, and the number N of receiving antennas of the wireless system is equal to or greater than 2, and a transmitter of the wireless system has more than two local oscillators, and a receiver of the wireless system has more than two independent local oscillators.

7. A frame synchronization apparatus of a wireless system, comprising:
a delaying circuit, configured to separately delay a signal received from one of N receiving antennas in K tributaries, and output K delayed signals, wherein N and K are positive integers;
a signal correlation enhancing circuit, configured to generate a first output signal by performing a correlation operation on the K delayed signals output by the delaying circuit and a preamble subsequence;
a relative frequency offset extracting circuit, configured to generate a second output signal by performing a correlation operation on each of the K delayed signals output by the delaying circuit and each of the K delayed signals itself; and
a cancelling circuit, configured to perform cancellation processing on the first output signal generated by the signal correlation enhancing circuit and the second output signal generated by the relative frequency offset extracting circuit to obtain a string of data stream; and obtain a maximum value of the string of data stream as a correlation peak, so as to determine a position of a frame header according to a time point corresponding to the correlation peak.

8. The apparatus according to claim 7, wherein:
the delaying circuit is configured to separately delay the signal received from one of N receiving antennas in the K tributaries and output K delayed signals, wherein a Kth tributary outputs a Kth delayed signal, and a delay quantity of the Kth delayed signal is a product of a length of K−1 preamble subsequences and a symbol period time.

9. The apparatus according to claim 7, wherein:
the signal correlation enhancing circuit is configured to perform a correlation operation with the length of the preamble subsequence on each of the K delayed signals and the preamble subsequence to output K first signals, and generate the first output signal by multiplying the K first signals.

10. The apparatus according to claim 7, wherein:
the relative frequency offset extracting circuit is configured to perform a correlation operation with the length of the preamble subsequence on each of the K delayed signals and each of the K delayed signals itself to output K second signals, and generate the second output signal by multiplying the K second signals.

11. The apparatus according to claim 7, wherein: a signal used by the delaying circuit is a transmitting signal that is sent by M transmitting antennas and received by one of the N receiving antennas, wherein a preamble sequence of the transmitting signal sent by one of the M transmitting antennas is generated by the K preamble subsequences that are periodically arranged, a length of the preamble sequence is K times the length of the preamble subsequence, and M is a positive integer.

12. The apparatus according to claim 11, wherein: in a wireless system that comprises the apparatus, the number M of transmitting antennas of the wireless system is equal to or greater than 2, and the number N of receiving antennas of the wireless system is equal to or greater than 2, and a transmitter of the wireless system has more than two independent local oscillators, and a receiver of the wireless system has more than two independent local oscillators.

13. A wireless system, comprising, a transmitter, M transmitting antennas, N receiving antennas, and a receiver, wherein the receiver comprises the frame synchronization apparatus of the wireless system according to claim 7, and wherein:
the transmitter is configured to generate a transmitting signal and send the transmitting signal to the M transmitting antennas;
the M transmitting antennas are configured to send the transmitting signal to the N receiving antennas;
the N receiving antennas are configured to receive the transmitting signal sent by the M transmitting antennas and send the transmitting signal to the receiver; and
the receiver is configured to process a signal from one of the N receiving antennas, wherein:
the frame synchronization apparatus of the wireless system is configured to separately delay the signal received from one of the N receiving antennas in K tributaries, and output K delayed signals, wherein N and K are positive integers; generate a first output signal by performing a correlation operation on the K delayed signals and a preamble subsequence; generate a second output signal by performing the correlation operation on each of the K delayed signals and each of the K delayed signals itself; and perform cancellation processing for the first output signal and the second output signal to obtain a string of data stream, and obtain a maximum value of the string of data stream as a correlation peak, so as to determine a position of a frame header according to a time point corresponding to the correlation peak.

14. The wireless system according to claim 13, wherein:
the N receiving antennas receive the transmitting signal sent by the M transmitting antennas, wherein a preamble sequence of the transmitting signal sent by one of the M transmitting antennas is generated by the K preamble subsequences that are periodically arranged, a length of the preamble sequence is K times a length of the preamble subsequence, and M is a positive integer.

15. The wireless system according to claim 13, wherein:
the number M of transmitting antennas of the wireless system is equal to or greater than 2, and the number N of receiving antennas of the wireless system is equal to or greater than 2, and a transmitter of the wireless system has more than two independent local oscillators, and a receiver of the wireless system has more than two independent local oscillators.

16. A non-transitory processor-readable storage medium having stored thereon processor-executable instructions configured to cause a processor to perform operations comprising:
separately delaying a signal received from one of N receiving antennas in K tributaries, and outputting K delayed signals, wherein N and K are positive integers;
generating a first output signal by performing a correlation operation on the K delayed signals and a preamble subsequence;
generating a second output signal by performing a correlation operation on each of the K delayed signals and each of the K delayed signals itself; and
performing cancellation processing on the first output signal and the second output signal to obtain a string of data stream, and obtaining a maximum value of the string of data stream as a correlation peak, so as to determine a position of a frame header according to a time point corresponding to the correlation peak.

17. The non-transitory processor-readable storage medium of claim 16, wherein the separately delaying a signal received from one of N receiving antennas in K tributaries, and outputting K delayed signals comprises:

separately delaying the signal received from one of the N receiving antennas in the K tributaries and outputting the K delayed signals, wherein a Kth tributary outputs a Kth delayed signal and a delay quantity of the Kth delayed signal is a product of a length of K−1 preamble subsequences and a symbol period time.

18. The non-transitory processor-readable storage medium of claim 16, wherein the generating a first output signal by performing a correlation operation on the K delayed signals and a preamble subsequence comprises:

performing a correlation operation with the length of the preamble subsequence on each of the K delayed signals and the preamble subsequence to output K first signals, and generating the first output signal by multiplying the K first signals.

19. The non-transitory processor-readable storage medium of claim 16, wherein the generating a second output signal by performing a correlation operation on each of the K delayed signals and each of the K delayed signals itself comprises:

performing a correlation operation with the length of the preamble subsequence on each of the K delayed signals and each of the K delayed signals itself to output K second signals, and generating the second output signal by multiplying the K second signals.

20. The non-transitory processor-readable storage medium of claim 16, wherein before the separately delaying a signal received from one of N receiving antennas in K tributaries, and outputting K delayed signals, the operations further comprises:

receiving, by the N receiving antennas, transmitting signals sent by M transmitting antennas, wherein a preamble sequence of the transmitting signal sent by one of the M transmitting antennas is generated by the K preamble subsequences that are periodically arranged, a length of the preamble sequence is K times the length of the preamble subsequence, and M is a positive integer.

\* \* \* \* \*